May 26, 1970  J. V. LEKAN  3,513,518
CUTTING TOOL
Filed Dec. 22, 1967
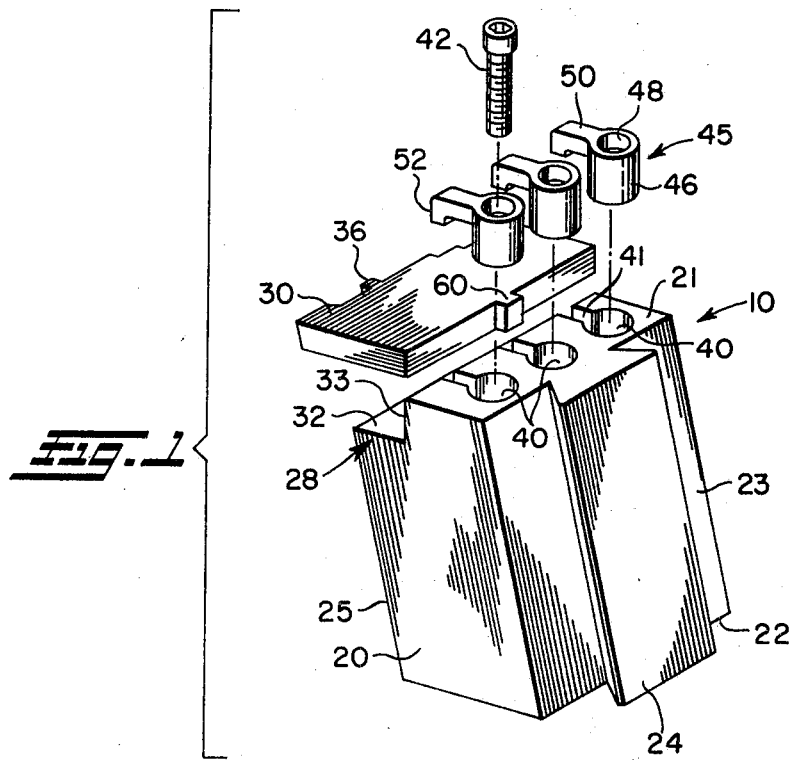
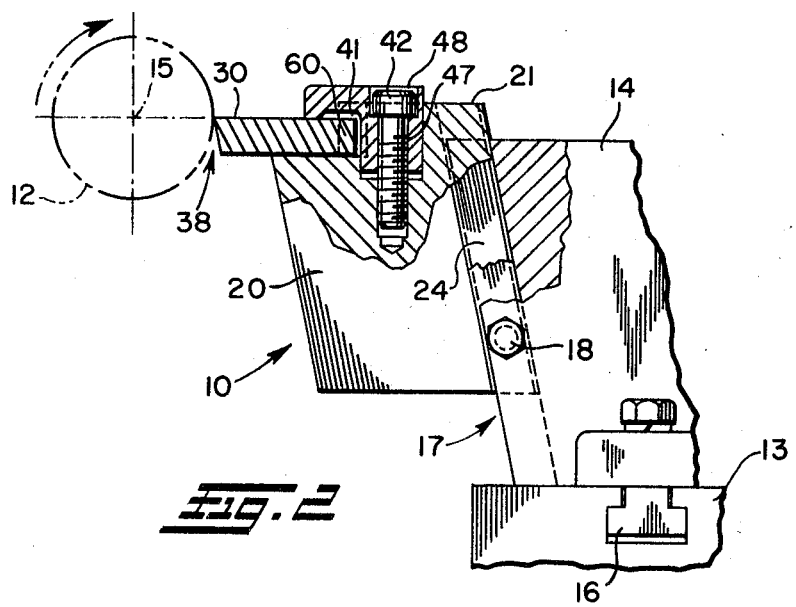
INVENTOR
JAMES V. LEKAN
BY Oberlin, Maky, Donnelly & Renner
ATTORNEYS United States Patent Office 3,513,518
Patented May 26, 1970

3,513,518
CUTTING TOOL
James V. Lekan, 2102 Corning Ave.,
Cleveland, Ohio 44109
Filed Dec. 22, 1967, Ser. No. 692,968
Int. Cl. B26d 1/00
U.S. Cl. 29—96                                1 Claim

ABSTRACT OF THE DISCLOSURE

A dovetail form tool for automatic screw machines and the like comprising a master dovetail block and an insert type form blade clamped therein, the form blade having a locating tongue for cooperation with the master block to allow repeatable alignment and predeterminable dimensioning.

---

This invention relates to form tools and more particularly to a dovetail type form tool having a replaceable insert type form bit for machining of workpieces in a single plunge motion.

Insert type cutting tools have become commonplace in the machining of lathe-type machines including automatic screw machines and single or multi-spindle automatic type machine tools. The insert type tooling allows the use of a relatively inexpensive blank for adaptation to the movable slides of the machine tool since it is only the insert bit itself which performs the cutting operation and which is worn down during use. The insert bit may be formed of a high grade cutting material which is often tool steel or carbide material while the blank may be formed of a relatively inexpensive material since it only provides support and positioning for the cutting bit. Regrinding of the insert bit to a desired dimension may be readily accomplished and may be repeated until the bit has served its useful life whereupon the bit may be removed and replaced by a new unit in the same blank or by a complete tool. Similarly, such insert bits may be prealigned in relation to the particular holder in a tool room or other area remote from the machining area so that merely by mounting a standard holder in a standard location on the machine tool slide, accurate dimensions may be attained.

Priorly, the insert bit technique has been applied primarily to the single point type cutting tool wherein only the extension of the insert bit in relation to the holder is of significance and a lateral prealignment is no necessary since the tool ordinarily undergoes a lateral movement during the machining operation. It is also known in the art to provide an insert type dovetail forming tool wherein a portion of the tool is comprised of a high hardness cutting material. It is usual in this type of tool to grind both the insert material and the tool holder with the desired form configuration primarily for ease of grinding since the whole face of the tool is exposed to the grinder, but also to provide maximum support for the machining insert. In a tool of this type, successive regrinds of the machining insert may be compensated for by an elevation of the entire dovetail tool in its holder to bring the cutting surface of the insert to a proper elevation in relation to the workpiece.

In general, the insert portion of such tools comprises a generous thickness since most of the tool cost is incurred in labor and an extended length of insert adds little to the cost but much to the number of available regrinds. Such tool, then, after a substantial amount of use, may be elevated in its holder so that only a portion of the dovetail is clamped therein resulting in an insecure support. Further, such dovetail tool must be replaced completely including not only the insert but the tool blank as well when a different type form cut is to be performed resulting in increased costs of tooling.

Therefore, it is an object of this invention to provide an improved tool holder for form type tools which may accommodate a variety of inserts and is more economical than prior art designs.

It is another object of this invention to provide an improved cutting tool of the dovetail form type which can accommodate relatively thin replaceable inserts and which exhibits a sturdier support throughout its cutting life.

It is still another object of this invention to provide an improved dovetail type form cutting tool wherein replaceable inserts are readily secured in the tool in a predetermined location.

It is a further object of this invention to provide a dovetail type form tool having replaceable and prealigned inserts and which may be readily varied in construction to accommodate different types of material being worked.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is an exploded perspective view of the cutting tool of this invention showing the mechanism for clamping and positioning the insert within the master blank of the tool and;

FIG. 2 is an elevational view partly in cross section of the cutting tool of this invention shown in relation to typical portions of a machine tool.

Referring now to the drawings, there is shown the dovetail form tool 10 of the invention in relation to a schematic showing of portions of a machine tool which in this embodiment will be referred to as an automatic screw machine although the machine could be any other type machine tool such as single spindle or multi-spindle automatic which employs a slide that moves in relation to a workpiece mounted in a spindle.

In FIG. 2, the workpiece 12 is shown in dashed lines mounted in a rotatable spindle of the automatic screw machine and the dovetail form tool 10 of the invention is shown mounted in a dovetail holder 14 (shown in part) which may be rigidly mounted on a cross slide table 13 of the machine by means of a conventional T-bolt 16 and slot mounting arrangement. The table of the machine is adapted for forward and rearward movement in a direction transverse to the axis of rotation 15 of the spindle and workpiece for form tool plunge cuts and in many types of machines, the table might as well be capable of linear motion in a direction parallel to the axis of rotation 15 of the spindle. The dovetail form tool 10 is mounted in a conventional manner in the dovetail holder 14 which consists of a mating dovetail slot 17 having an adjustable clamp forming one side of the dovetail slot 17 which may be drawn into clamping relation by bolt 18 to releasably secure the dovetail tool 10 to the holder 14.

As seen more clearly in FIG. 1, the dovetail form tool 10 of the invention comprises, in general, a rectangular solid parallelepiped forming the master block 20 and having a forward slope of approximately 10–12° from the vertical. The dovetail holder 14 has a similar slope on its forward face, such angle being conventional for dovetail type holders and not critical but providing a forward and upward adjustment of the dovetail tool 10 in the holder 14 to accommodate regrinding of the tool 10 as will be explained in greater detail hereinafter. The upper 21 and lower 22 faces of the dovetail tool 10 are approximately horizontal and the rear face 23 of the dovetail tool 10 includes a conventional dovetail configuration 24 milled into the master block 20 at such predetermined angle.

The forward 25 and upper 21 faces of the master block 20 are milled longitudinally to provide a shelf or seat 28 for receipt of the insert type forming tool 30. In this embodiment of the invention, the lower surface 32 of the seat 28 in the master block 20 is horizontal and thus parallel to the forward and rearward direction of movement of the machine tool slide and holder 14 and the back surface 33 of the seat 28 is milled approximately vertically and at a right angle to the lower surface 32, although this angle is not critical and may vary to some extent. The angle of the lower surface 32 of the seat 28 in relation to a horizontal line or the line of forward and rearward movement of the cross slide or holder 14, determines the rake angle of the cutting tool 30 and is different for various types of workpiece materials. Thus in FIG. 2 where a horizontal lower surface 32 or an angle of 0° is shown, such seat may be suitable for turning brass or workpieces of relatively soft material. For steel and somewhat harder workpieces, such rake angle or angle of the lower surface 32 of the seat 28 may be on the order of approximately 10–12°. Similarly, the back surface 33 of the seat 28 will remain substantially perpendicular to the lower surface 32 and accordingly, will vary from approximately 0–12° from the vertical showing in FIGS. 1 and 2.

The master block 20 of the dovetail form tool 10 is conveniently fabricated of an alloy type steel which is relatively soft in relation to the hardness of the insert tool blade 30 which performs the actual machining operation. Since the master block 20 provides a relatively large areas at the lower surface 32 of the seat 28 for support of the insert blade 30, relatively soft alloy steel may be utilized resulting in an economy of fabrication.

As seen most clearly in FIG. 1, the insert tool blade 30 comprises a generally rectangular solid piece of tool steel having a desired form configuration or profile 36 milled in the front face thereof and adapted for receipt in the seat 28 of the master block 20. The front surface profile 36 of the insert blade 30 is usually ground at an angle corresponding to the angle of forward slope of the master block 20 thereby providing a clearance angle 38 for the machining operation. Such clearance angle 38 again variable to some extent depending on the type of material being machined but in the usual operation is on the order of 10–15° from the vertical.

On the top surface 21 of the master block 20 are drilled a series of three colinear holes 40 extending for a depth into the block 20 a short distance past the lower surface 32 of the blade seat 28. Such holes 40 are drilled approximately vertically into the master block 20 but could as well be angularly disposed for blocks designed for cutting different workpiece materials. Each of the holes is drilled on a smaller diameter to a greater depth and then threaded for receipt of an Allen head cap screw 42. Further, the master block 20 is milled transversely to the seat 28 to connect each of the holes 40 to the blade seat 28 with a slot 41 and each slot 41 is preferably slightly undercut below the seat 28.

A clamping arrangement comprising three retaining nibs 45 is provided for securing the insert blade 30 in the seat 28 of the master block 20. Each retaining nib 45 consists of a generally cylindrical portion 46 having a bore 47 therein to clear the threaded portion of the cap screw 42 and having a counterbore 48 to receive the head of the cap screw 42. Further, each nib 45 comprises a transversely extending arm 50 having a depending abutment leg 52 thereon. The diameter of the cylindrical portion 46 is slightly smaller than the holes 40 in the master block 20 so that the retaining nibs 45 may be snugly received therein. The arm 50 of each retaining nib 45 is of a thickness on the order of the width of the milled slot 41 in the master block 20 so that the arm 50 is slidably engaged in the slot 41. Such arrangement permits a vertical movement of the retaining nib 45 while preventing rotation of the cylindrical portion 46 in the corresponding hole 40.

The cap screw 42 provided for each of the retaining nibs 45 passes through the bore 47 in the cylindrical portion 46 of the nib 45 and is threaded into the master block 20 so that by loosening of the cap screws 42, freedom of vertical movement of the retaining nibs 45 may be allowed or alternatively, the cap screws 42 may be tightened securely to draw the retaining nibs 45 into the holes 40 in the master block 20 causing the abutment leg 52 to engage the upper surface of the insert blade 30 and secure the blade 30 against the lower surface 32 of the blade seat 28.

Further, on the rear surface of the insert blade 30 is provided a tongue 60 having a width on the order of the width of the slot 41 joining the center hole 45 in the master block 20 with the blade seat 28. The tongue 60 in this embodiment is integral with the blade 30, being formed by grinding away the rear surface of the insert blade 30 or alternatively, it may be formed of a rectangular piece of material brazed or welded into position on the back surface of the blade 30.

It is clear then that the tongue 60 provides a reference position for aligning the location of the insert blade 30 with the master block 20 of the dovetail tool 10. The tongue 60 provides a means of cooperation between the insert blade 30 and the master block 20 such that a series of insert blades may be produced for various types of form cuts or replaceable blades may be ground so that reproducible results may be obtained when the blade 30 is inserted in the master block 20. In typical machining operations, since the master block 20 is rigidly clamped in the dovetail holder 14 and the dovetail holder 14 is rigidly mounted on a cross sliding table 13 or the like, no relative movement between the components can occur so that the forming face 36 of the insert blade 30 may be related accurately to the workpiece 12 mounted in the spindle.

It is clear also that the single tongue 60 arrangement on the insert blade 30 shown in FIG. 1 is but one manner of achieving alignment between the insert blade 30 and the master block 20 and in the alternative a plurality of tongues cooperating with the slots 41 in the master block 20 could be utilized as well. It is clear also that although the insert blade 30 shown in FIG. 1 is approximately of the same length as that of the blade seat 28, that longer or shorter insert blades having a similar alignment tongue may be utilized as well provided only that the retaining nibs 45 suitably engage the insert blade 30 to retain it in position on the blade seat 28. In the preferred embodiment of the invention, the rear face of the insert blade 30 is machined at an angle to correspond with the back surface 33 of the blade seat 28 so that a flush abutment occurs therebetween when the insert blade 30 is fully engaged and the back surface 33 of the seat 28 provides a rigid support for cutting forces.

Referring now to FIG. 2, it may be seen that when the insert blade 30 becomes dull or worn the top surface thereof closely adjacent the profile 36 may be reground to provide a new cutting edge for the insert blade 30. Since the profile 36 has been milled completely through the thickness of the insert blade 30, the relative dimensions of the profile will remain unchanged. However, the elevation of the new cutting edge of the insert blade 30 in relation to the center line 15 of the workpiece 12 will be correspondingly lowered and this must be compensated for by a loosening of the bolts 18 in the dovetail holder 14 and raising the dovetail tool 10 a corresponding amount to bring the cutting edge of the insert blade 30 back to center of the workpiece 12 or to any other desired relation.

Such upward movement of the dovetail tool 10 will cause a corresponding forward movement also toward the workpiece 12 due to the forward slope of the dovetail clamp 17 and the dovetail tool 10, thereby eliminating the need for making any other transverse adjustment of the tool 10 or tool holder 14.

It will be apparent that such regrinding and adjustment of the dovetail tool 10 will seat the master block 20 higher in relation to the dovetail holder 14 and it is one advantage of this invention that even a substantial regrinding of the insert blade 30 will cause insufficient upward movement of the dovetail tool 10 to cause a relatively unstable condition to exist between the dovetail tool 10 and the dovetail holder 14. In prior art designs wherein the insert bit is brazed into and forms a substantial portion of the master block of such a dovetail tool, excessive regrinding of the insert will necessitate an excessive upward movement of the dovetail tool and a resulting insecure structure.

It will be apparent also that the dovetail tool 10 of the invention is a relatively sturdy and rigid structure. Although some overhang of the insert blade 30 is shown in FIG. 2, this dimension is merely a matter of choice and may be reduced so that the profile 36 is closely adjacent the front surface 25 of the master block 20 to attain maximum strength. Further, it is clear that sharpening of the dovetail tool 10 is facilitated by this construction in that it is only necessary to remove the insert blade 30, once the tooling has been set up for a particular machining operation. Regrinding of the insert blade 30 may then be readily accomplished and the blade 30 returned accurately to the master block 20, requiring only the final adjustment of elevation of the complete dovetail tool 10 in relation to the holder 14. Alternatively, as is common practice, the dovetail tool 10 may be removed completely for regrinding of the blade 30 in a standard dovetail grinding fixture.

Economy of tooling is also realized in that only different insert blades are necessary for different machining operations requiring only a minimal expenditure. Similarly, damage to tooling most often will occur to only the insert blade 30, which often can be accommodated by regrinding, and even if not possible, scrap loss of the complete tool is avoided.

Other modes of applying the principles of the invention may be employed, change being made as regards the details described, provided the features stated in any of the following claims or the equivalent of such be employed.

I, therefore, particularly point out and distinctly claim as my invention:

1. A dovetail form tool adapted for receipt in a dovetail holder mounted on a reciprocative slide of a machine tool for plunge forming of a workpiece supported in a spindle of the machine tool comprising a master block of generally rectangular solid configuration having a dovetail at the rear face thereof for releasable engagement in a dovetail slot of the holder, the dovetail and slot being substantially vertically oriented to provide a vertical adjustment of said master block in relation to the holder, said master block having a laterally extending shelf at the forward and upper edge thereof adjacent and parallel to the workpiece, an insert blade of generally rectangular solid configuration adapted for seating engagement on the shelf of said master block, said blade having a form profile on an outer edge thereof extending forwardly from said master block for machining engagement with the workpiece, alignment means cooperative between said insert blade and said master block for providing a registered position for said insert blade in said master block, said alignment means comprising a groove in the rear surface of the shelf of said master block and a mating tongue on the rear edge of said insert blade engageable in the groove to define a predetermined lateral alignment between said blade and said block, and means for releasably clamping said insert blade to said master block to provide a rigid structure for the machining operation, said releasable clamping means comprising a nib received in an opening in the top surface of said master block, said nib being adapted to be drawn into the opening by a retaining screw engaged in a threaded portion of the opening, said groove comprising a slot communicating with the opening and the shelf of said master block, a portion of said nib extending through said slot to engage the upper surface of said insert blade for clamping the same, said slot providing a guide for vertical movement and rotative alignment of said nib, and the tongue on said insert blade being receivable in said slot for providing lateral alignment of said block.

References Cited

UNITED STATES PATENTS

| | | | |
|---|---|---|---|
| 1,060,749 | 5/1913 | Frederick | 29—96 |
| 1,368,070 | 2/1921 | Stone | 29—96 |
| 1,409,719 | 3/1922 | Hunt | 29—96 |
| 2,787,823 | 4/1957 | Kennicott | 29—96 |
| 2,848,789 | 8/1958 | Friedline | 29—96 |
| 2,908,963 | 10/1959 | Gollus | 29—96 |
| 3,063,318 | 11/1962 | Schlappal | 29—98 |

FOREIGN PATENTS

| | | |
|---|---|---|
| 1,347,378 | 1/1963 | France. |

HARRISON L. HINSON, Primary Examiner